United States Patent
Cockerill

(10) Patent No.: US 9,109,500 B2
(45) Date of Patent: Aug. 18, 2015

(54) CHARGE AIR COOLER HOUSING WATER TRAP

(71) Applicant: FORD GLOBAL TECHNOLOGIES, LLC, Dearborn, MI (US)

(72) Inventor: Charles Allen Cockerill, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 76 days.

(21) Appl. No.: 13/945,952

(22) Filed: Jul. 19, 2013

(65) Prior Publication Data
US 2015/0020521 A1    Jan. 22, 2015

(51) Int. Cl.
F02B 29/04 (2006.01)
(52) U.S. Cl.
CPC .................................... *F02B 29/04* (2013.01)
(58) Field of Classification Search
USPC ........................................ 60/599; 50/426, 427
See application file for complete search history.

(56) References Cited

U.S. PATENT DOCUMENTS

| | | | |
|---|---|---|---|
| 3,063,682 A * | 11/1962 | Greene et al. | 165/110 |
| 4,436,145 A | 3/1984 | Manfredo | |
| 4,877,431 A * | 10/1989 | Avondoglio | 55/321 |
| 5,505,060 A * | 4/1996 | Kozinski | 62/503 |
| 6,301,887 B1 * | 10/2001 | Gorel et al. | 60/605.2 |
| 6,557,371 B1 * | 5/2003 | Judge | 62/468 |
| 6,978,772 B1 * | 12/2005 | Dorn et al. | 123/568.12 |
| 7,694,528 B2 * | 4/2010 | Nishida et al. | 62/500 |
| 7,980,076 B2 * | 7/2011 | Buia et al. | 60/599 |
| 7,992,628 B2 | 8/2011 | Melby | |
| 8,206,491 B2 * | 6/2012 | Karvinen | 95/267 |
| 2003/0075046 A1 * | 4/2003 | Lenzing | 95/267 |
| 2004/0079079 A1 | 4/2004 | Martin | |
| 2004/0154272 A1 * | 8/2004 | McKenzie | 55/423 |
| 2007/0261400 A1 | 11/2007 | Digele | |
| 2009/0031999 A1 * | 2/2009 | Erickson | 123/563 |
| 2010/0229549 A1 * | 9/2010 | Taylor | 60/599 |
| 2010/0242929 A1 * | 9/2010 | Kardos et al. | 123/568.12 |
| 2010/0300647 A1 * | 12/2010 | Steurer et al. | 165/52 |
| 2011/0094219 A1 | 4/2011 | Palm | |
| 2014/0048050 A1 * | 2/2014 | Pfab | 123/568.12 |

FOREIGN PATENT DOCUMENTS

| | | |
|---|---|---|
| EP | 1710526 B1 | 5/2008 |
| FR | 2885209 A1 | 11/2006 |

* cited by examiner

*Primary Examiner* — Jesse Bogue
(74) *Attorney, Agent, or Firm* — Greg P. Brown; Brooks Kushman P.C.

(57) ABSTRACT

A charge air cooler includes a cooler housing configured to couple with an intercooler core outlet and having a condensate/water trap disposed within the cooler housing. The water trap is configured to inhibit water passing through the housing outlet. The water trap is further configured to collect the water and introduce it to the engine at a controlled rate.

9 Claims, 5 Drawing Sheets

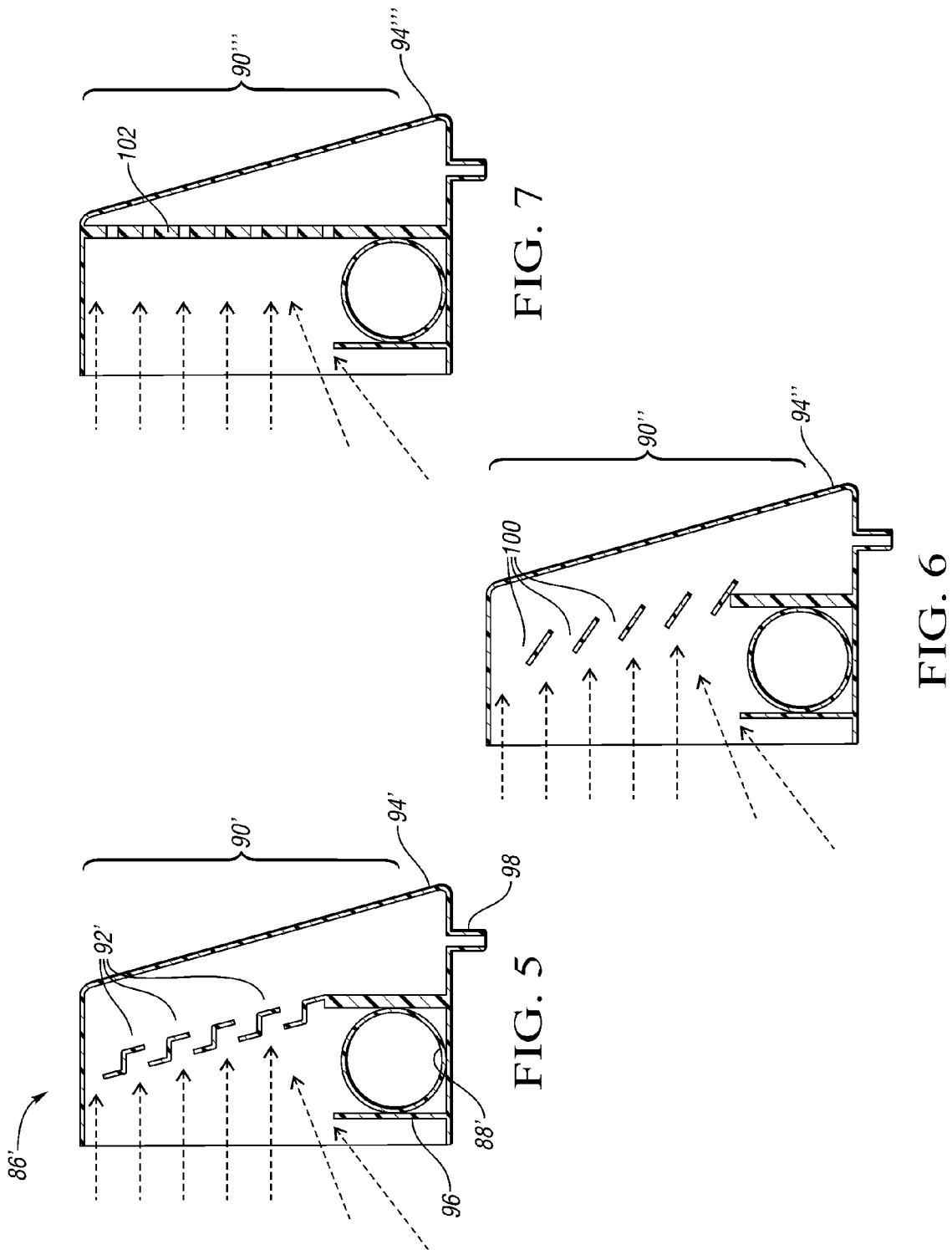

CHARGE AIR COOLER HOUSING WATER TRAP

TECHNICAL FIELD

This disclosure relates generally to a charge air cooler coupled to an intake manifold of a turbocharged engine in a motor vehicle.

BACKGROUND

Turbocharged and supercharged engines may be configured to compress ambient air entering the engine to increase power. Because compressing the air may cause an increase in temperature of the air, a charge air cooler may be utilized to cool the heated air, increasing its density and further increasing the potential power of the engine. If the humidity of the ambient air is high, condensation may form on any internal surface of the charge air cooler that is colder than the dew point of the compressed air. During operating conditions such as high vehicle acceleration, for example, these water droplets may be blown out of the charge air cooler and into the combustion chambers of the engine. This may result in engine misfire, loss of torque and engine speed, and incompletely burned fuel, for example.

A previous solution involved placing condensation traps in fluid communication with ducts downstream of the charge air cooler. However, such traps may only be able to redirect limited quantities of condensate, and add additional components and complexity to the turbocharger system.

SUMMARY

An embodiment of a charge air cooler according to the present disclosure comprises a cooler housing configured to couple with an intercooler core outlet. The charge air cooler also has a water trap disposed within the cooler housing. The water trap is configured to inhibit water passing through the housing outlet.

In some embodiments, the water trap may include a louver assembly. In other embodiments, the water trap may include a perforated plate positioned generally normal to a direction of air flow. In some embodiments, the housing further includes a drain port in fluid communication with an engine intake manifold. The charge air cooler may additionally include a deflector plate located upstream of the housing outlet. In such an embodiment, the deflector plate is configured to deflect water past the housing outlet. In yet another embodiment, the water trap is located downstream of the housing outlet. In such an embodiment, the water trap cooperates with a housing wall to define a condensation capture tank.

A method for reducing engine misfires in an internal combustion engine having a charge air cooler includes trapping condensate within a charge air cooler housing, collecting the condensate, and introducing the condensate into the engine at a controlled rate.

In some embodiments of the method, trapping condensate within a charge air cooler housing includes directing the condensate through a louver assembly. In other embodiments, trapping condensate includes directing the condensate through at least one aperture in a plate positioned generally normal to a direction of air flow within the charge air cooler housing. In yet other embodiments, the method includes draining the condensate through a port in the charge air cooler housing, where the port is in fluid communication with an engine intake manifold.

A method for reducing engine misfires in an internal combustion engine having a charge air cooler according to the present disclosure includes inhibiting accumulated condensate from being drawn out of a charge air cooler into an intake manifold by trapping the condensate within a cooler housing.

In an embodiment of the method, trapping the condensate within the cooler housing includes directing the condensate through a plurality of slats into a capture tank. In another embodiment, the method includes introducing the condensate to the internal combustion engine at a limited rate.

Embodiments according to the present disclosure provide a number of advantages. For example, the present disclosure provides a method for reducing engine misfires by inhibiting condensate from being drawn out of a charge air cooler into the engine. A charge air cooler according to the present disclosure also adds less complexity to a turbocharger system than previous methods.

The above advantages and other advantages and features of the present disclosure will be readily apparent from the following detailed description of the preferred embodiments when taken in connection with the accompanying drawings.

BRIEF DESCRIPTION OF THE DRAWINGS

FIGS. 5-7 schematically illustrate operation of a water trap in a cooler housing according to various embodiments of the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
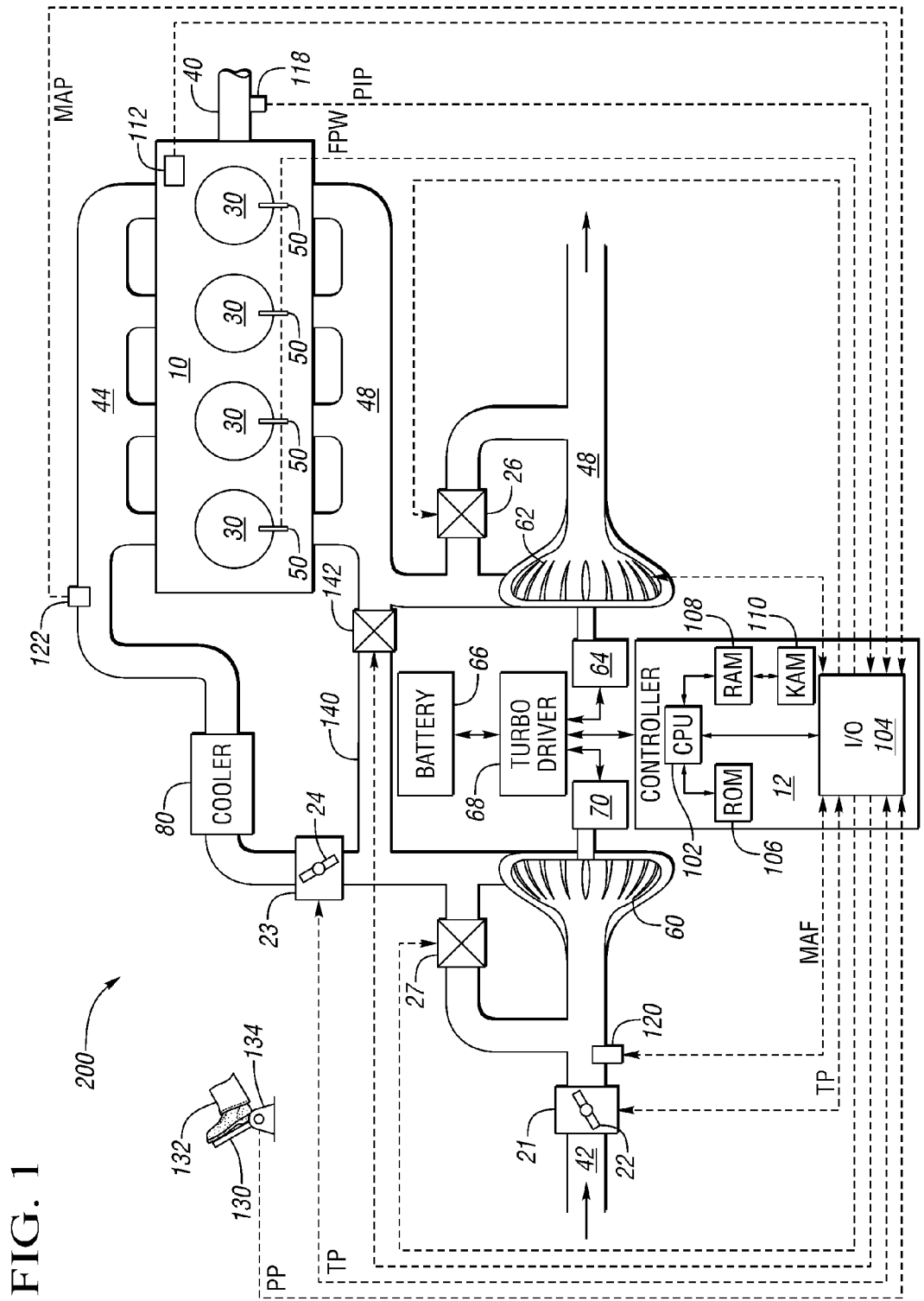
FIG. 1 is a schematic diagram of an engine including a charge air cooler and a condensation trap according to the present disclosure.

Referring now to FIG. 1, a schematic diagram shows engine 10, which may be included in a propulsion system of an automobile. The engine 10 is shown with four cylinders 30. However, other numbers of cylinders may be used in accordance with the present disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 48 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in response to a signal received from controller 12. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an electric motor or actuator included with throttles 21 and 23, a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TR Intake passage 42 may further include a mass air flow sensor 120 and a manifold air pressure sensor 122 for providing respective signals MAF and MAP to controller 12.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIR Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust oxygen (O2) sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may be coupled to an electric generator 64, to provide power to a battery 66 via a turbo driver 68. Power from the battery 66 may then be used to drive the compressor 60 via a motor 70.

Exhaust passage 48 may include wastegate 26 for diverting exhaust gas away from turbine 62. Additionally, intake passage 42 may include a wastegate 27 configured to divert intake air around compressor 60. Wastegate 26 and/or 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

If the humidity of the ambient air is high, condensation may form on any internal surface of the charge air cooler that is colder than the dew point of the compressed air. During conditions such as high vehicle acceleration, these water droplets may be blown out of the charge air cooler and into the combustion chambers of the engine resulting in engine misfire, loss of torque and engine speed, and incompletely burned fuel, for example.

Figure 2:
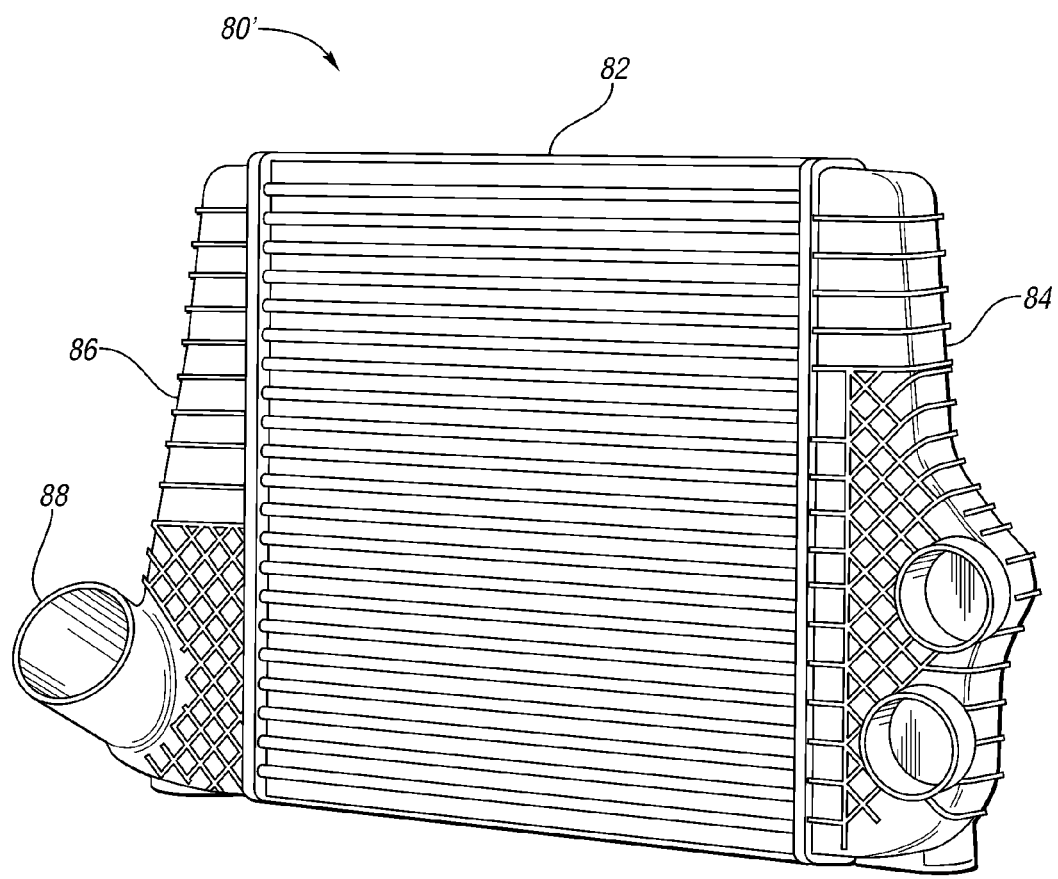
FIG. 2 illustrates a charge air cooler having an intercooler core and attached housing according to various embodiments of the present disclosure.

A charge air cooler according to the present disclosure will be described in conjunction with FIGS. 2, 3, and 4. Referring now to FIG. 2, a CAC 80' is shown. CAC 80' may be incorporated into a turbocharger or supercharger system such as that illustrated in FIG. 1. CAC 80' includes a cooler core 82, an inlet housing 84, and an outlet housing 86 having an outlet 88. In this embodiment CAC 80' is intended for use in a "twin turbo" system having two turbochargers, and thus inlet housing 84 includes two inlet ports (not numbered). Inlet housing 84 directs intake gases into cooler core 82, within which heat exchange takes place to cool the intake gases. The cooled intake gases are then directed through outlet housing 86, exiting outlet 88, and into a passage (not shown) connecting to an engine intake manifold.

As previously described, if the humidity of the ambient air is high, moisture in the intake gases may condense on the internal surfaces of components including cooler core 82. During some operating conditions, such as a heavy acceleration, accumulated condensation may be drawn out of cooler core 82.

Figure 3:
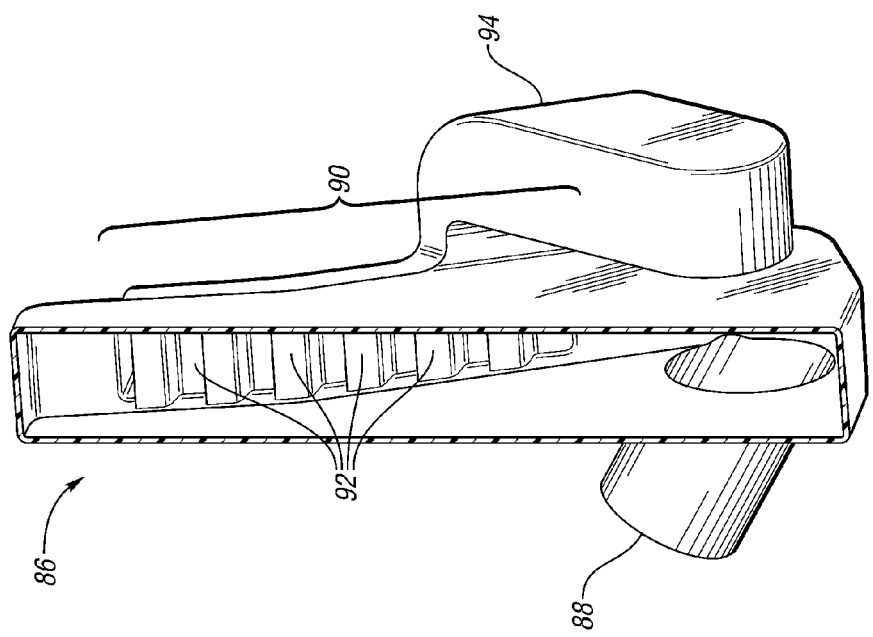
FIG. 3 illustrates a front view of an embodiment of a charge air cooler housing according to the present disclosure.

Referring now to FIG. 3, outlet housing 86 includes a water trap 90 to reduce or prevent the condensation from being drawn into the intake manifold. In this embodiment, water trap 90 includes a plurality of louvers 92 forming a louver assembly. Other water trap configurations are, of course, possible, including using a perforated plate in place of louvers 92. Water trap 90 further includes a reservoir 94. Condensation that accumulates in cooler core 82, if drawn out of cooler core 82, flows through louvers 92 and is stored in reservoir 94. The louvers 92 define a plurality of passages that direct flow generally downward and back into reservoir 94, as will be described further with respect to FIG. 5. The outlet housing also includes a deflector plate (not shown in this cutaway) positioned upstream of the outlet 88. The deflector plate has a surface oriented generally normal to the direction of intake gas flow, and extending vertically to a height at least equal to the diameter of the outlet 88. In this fashion, any condensate present in the intake gas is deflected above the outlet 88 and into the water trap. The water or condensation trap further includes a drain port (not shown) in fluid communication with the reservoir. The drain port may be connected with a drain line, which may in turn be connected with the engine intake manifold. Trapped condensate may drain from the reservoir through the drain port into the drain line and into the engine. In this fashion, condensate may be trapped and introduced to the engine at a controlled rate to avoid misfires. Although the drain line could be used in other configurations to drain condensate to other engine locations, it is preferable to introduce the condensate into the engine to avoid releasing potential pollutants into the atmosphere and to comply with environmental regulations. The housing and water trap assembly may be made out of molded plastic or other appropriate materials.

Figure 4:
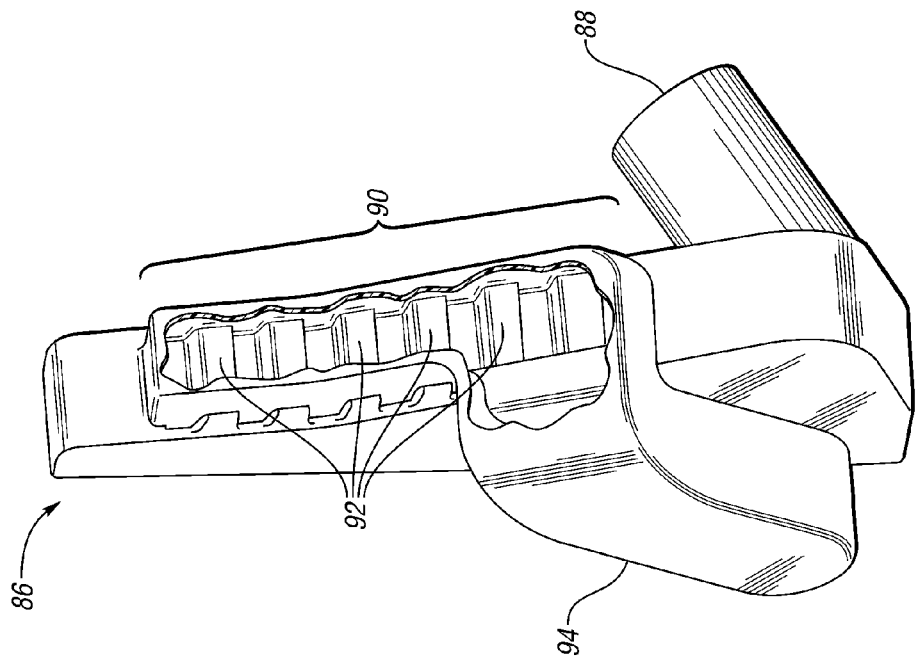
FIG. 4 illustrates a rear view of an embodiment of a charge air cooler housing according to the present disclosure.

FIG. 4 illustrates a rear view of outlet housing 86. The water trap 90 includes a louver assembly having a plurality of louvers 92. In this embodiment, the louver assembly does not extend the full height of the outlet housing 86, but rather has a lower boundary above the outlet 88. The water trap 90 further includes a reservoir 94.

Referring now to FIG. 5, operation of an embodiment of a water trap according to the present disclosure is illustrated schematically. Outlet housing 86' includes an outlet 88'. Deflector plate 96 is positioned upstream of the outlet 88' and extends to a height at least equal to a diameter of outlet 88'. Outlet housing 86' also includes a water trap 90'. Water trap 90' includes a plurality of louvers 92'. Louvers 92' define a plurality of passages leading generally downward to reservoir 94'. Reservoir 94' is connected to a drain port 98. Drain port 98 is connected to a drain line (not shown) which is in turn connected to the engine intake manifold.

In operation, if condensation is drawn out of the cooler core, as represented by the dashed arrows, the condensation flows into the outlet housing 86'. Condensation is deflected above the outlet 88' by deflector plate 96. The condensation passes through the passages defined by louvers 92' and into reservoir 94', where it is retained. Intake gases can freely pass back through the passages and through outlet 88' to the intake manifold. The retained or trapped condensation is then introduced to the intake manifold at a controlled rate by drain port 98. This may be performed by passive means, such as by sizing a passage in drain port 98 to control flow, or by active means, such as including an actuatable valve in drain port 98 or in the drain line.

FIGS. 6 and 7 display alternative embodiments of a charge air cooler housing having a water trap according to the present disclosure. In FIG. 6, water trap 90" includes a plurality of slats 100. Slats 100 define a plurality of passages configured to direct condensation generally downward into reservoir 94". In FIG. 7, water trap 90'" includes a perforated plate 102. Plate 102 has a surface oriented generally normal to the flow of intake gases, although other orientations are possible. The surface includes a plurality of perforations or apertures through which condensation may pass and be retained in reservoir 94'". Other configurations of water traps are, of course, possible.

Figure 8:
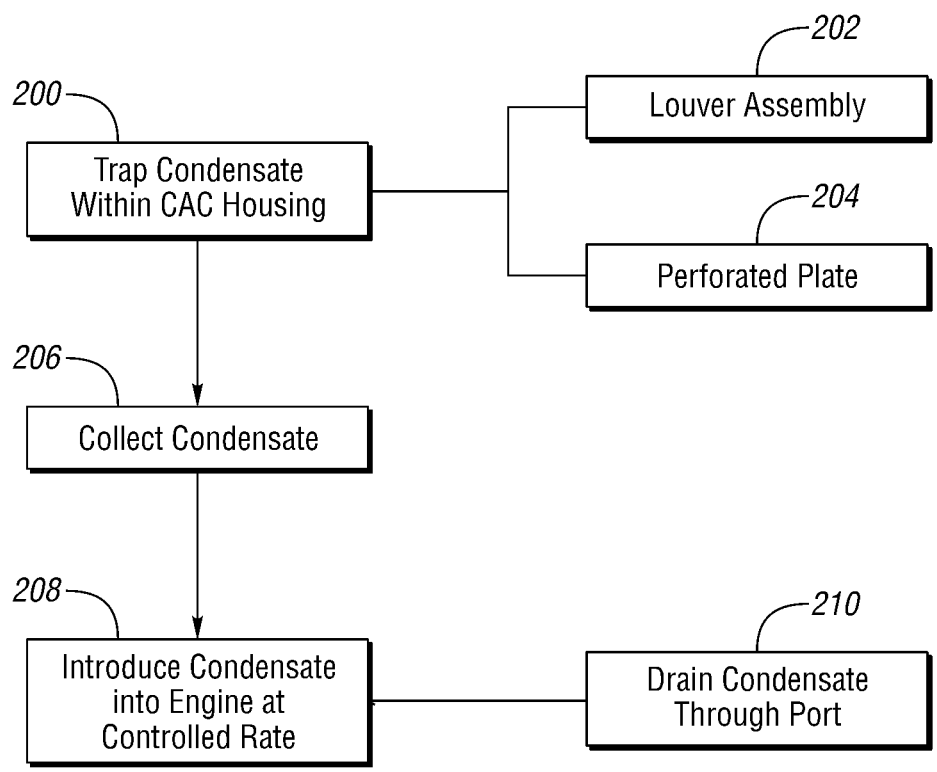
FIG. 8 is a flowchart illustrating a method of reducing engine misfires according to various embodiments of the present disclosure.

Referring now to FIG. 8, a method of preventing engine misfires according to the present disclosure is shown in flowchart form. Condensate is trapped within a charge air cooler housing, as illustrated by block 200. This may be performed using a louver assembly, as illustrated by block 202, a perforated plate, as illustrated by block 204, or other water trap configurations as appropriate. The method then includes collecting the condensate, as illustrated in block 206. This may be performed by means of a reservoir or other collection and storage means as appropriate. The method additionally includes introducing the condensate into the engine at a controlled rate, as illustrated in block 208. This may be performed by draining the condensate through a drain port, as illustrated in block 210, or by other means.

As can be seen from the various embodiments, the present invention provides a method for reducing engine misfires by inhibiting condensate from being drawn out of a charge air cooler into the engine. A charge air cooler according to the present disclosure also adds less complexity to a turbocharger system than previous methods.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A charge air cooler for use with an internal combustion engine comprising:
   a cooler housing having a housing outlet, the cooler housing configured to couple with an intercooler core outlet;
   a deflector plate arranged within the cooler housing upstream of the housing outlet and configured to deflect water past the housing outlet; and
   a water trap including a louver assembly disposed within the cooler housing and configured to inhibit water passing through the housing outlet.

2. The charge air cooler of claim 1, wherein the water trap is located downstream of the housing outlet and cooperates with a housing wall to define a condensation capture tank.

3. The charge air cooler of claim 1, wherein the housing further comprises a drain port configured for fluid communication with an engine intake manifold.

4. The charge air cooler of claim 3 wherein the drain port includes an orifice sized to provide a desired rate limit for condensate inducted into the intake manifold.

5. A method for reducing engine misfires in an internal combustion engine having a charge air cooler, the method comprising:
   providing a charge air cooler housing with a water trap dividing the housing into an upstream portion and a downstream portion, the water trap including a louver assembly;
   directing condensate from the upstream portion past a housing outlet and then through the louver assembly;
   collecting the condensate in the downstream portion; and
   introducing the condensate into the engine at a controlled rate.

6. The method of claim 5, wherein introducing the condensate into the engine includes draining the condensate through a port in the charge air cooler housing, the port being in fluid communication with an engine intake manifold.

7. A charge air cooler for use with an internal combustion engine comprising:
   a cooler housing;
   a louver assembly arranged within the cooler housing and dividing the cooler housing into a first portion and a second portion, the louver assembly being configured to direct water into the second portion;
   a housing inlet in the first portion and configured to couple with an intercooler core outlet;
   a housing outlet in the first portion; and
   a deflector plate arranged between the housing inlet and the housing outlet and configured to deflect water past the housing outlet.

8. The charge air cooler of claim 7, further comprising a drain port in the second portion, the drain port being configured for fluid communication with an engine intake manifold.

9. The charge air cooler of claim 8, wherein the drain port includes an orifice sized to provide a desired rate limit for condensate inducted into the intake manifold.

* * * * *